(12) United States Patent
Schumacher (10) Patent No.: US 8,205,733 B2
(45) Date of Patent: Jun. 26, 2012

(54) CLUTCH RING TRAVEL LIMITER

(75) Inventor: Jeffrey W. Schumacher, North Canton, OH (US)

(73) Assignee: The Timken Company, Canton, OH (US)

( * ) Notice: Subject to any disclaimer, the term of this patent is extended or adjusted under 35 U.S.C. 154(b) by 863 days.

(21) Appl. No.: 12/182,450

(22) Filed: Jul. 30, 2008

(65) Prior Publication Data
US 2009/0032355 A1 Feb. 5, 2009

Related U.S. Application Data

(60) Provisional application No. 60/952,954, filed on Jul. 31, 2007.

(51) Int. Cl.
*F16D 11/10* (2006.01)
*B60K 23/08* (2006.01)

(52) U.S. Cl. .................. 192/69.41; 192/69.9; 192/85.15; 192/85.49; 192/85.58; 192/109 R (58) Field of Classification Search ............... 192/69.41, 192/69.4, 69.42, 69.43, 69.9
See application file for complete search history.

(56) References Cited

U.S. PATENT DOCUMENTS

| | | | | |
|---|---|---|---|---|
| 5,950,785 | A | * | 9/1999 | Adachi et al. ............... 192/69.41 |
| 5,984,422 | A | | 11/1999 | Seifert |
| 6,170,628 | B1 | * | 1/2001 | Bigley ....................... 192/69.41 |
| 6,299,360 | B1 | | 10/2001 | Dougherty et al. |
| 7,143,883 | B2 | | 12/2006 | McCalla et al. |
| 2006/0124427 | A1 | * | 6/2006 | McCalla et al. ........... 192/69.41 |

* cited by examiner

*Primary Examiner* — Rodney Bonck
(74) *Attorney, Agent, or Firm* — Polster, Lieder, Woodruff & Lucchesi, L.C.

(57) ABSTRACT

An integrated wheel end which includes a movable clutch ring for selective engagement between an engaged and disengaged position for transferring driving torque from a drive shaft to the wheel end. The integrated wheel end incorporates a clutch ring abutment feature or travel limiter configured to position the movable clutch ring relative to a coupler on the wheel end during assembly with the drive shaft.

5 Claims, 7 Drawing Sheets

CLUTCH RING TRAVEL LIMITER

CROSS-REFERENCE TO RELATED APPLICATIONS

The present application is related to, and claims priority from, U.S. Provisional Patent Application Ser. No. 60/952,954 filed on Jul. 31, 2007, and which is herein incorporated by reference.

STATEMENT REGARDING FEDERALLY SPONSORED RESEARCH

Not Applicable.

BACKGROUND OF THE INVENTION

The present invention is related generally to the assembly of an integrated wheel end which includes a movable clutch ring for selective engagement between an engaged and disengaged position for transferring driving torque from a drive shaft to the wheel end, and in particular, to a coupler ring abutment feature configured to position the movable clutch ring relative to a coupler on the wheel end during assembly with the drive shaft.

In vehicles which have the ability to convert between two-wheel and four-wheel drive, a means must be provided to connect and disconnect the part-time drive wheels from the engine's drive shaft. One mechanism to accomplish this may be provided by a mechanical connect/disconnect at the integrated wheel ends for the part-time drive wheels. A drive component of the integrated wheel end, referred to as a coupler, has external splines which are in close axial relationship to a driven drive shaft having matching external splines. A clutch ring having internal splines which match the external splines of the coupler and the external splines of the drive shaft is disposed in engagement with the splines of the drive shaft and may be axially displaced for sliding engagement with the external splines of the coupler to selectively couple and decouple the drive shaft from the wheel end. An actuating mechanism, including a shift fork, is engaged with the outer peripheral edge of the clutch ring to provide for mechanical axial movement of the clutch ring into and out of engagement with the coupler. Axial movement of the shift fork during engagement is generally limited by an abutting relationship with a knuckle surface of the integrated wheel end.

Currently, as an integrated wheel end is assembled, there is a possibility that the external splines on the movable clutch ring or torque disconnect feature may not align with the external splines on the drive shaft. If this happens, and a retention nut on the drive shaft is tightened, the shift fork holding the movable clutch ring in place may fracture or deform in response to the axial forces applied to the movable clutch ring by the ends of the drive shaft splines.

Specifically, as the integrated wheel end is being assembled to the drive shaft, the clutch teeth of the clutch ring and the coupler on the wheel end are aligned, but the drive shaft clutch teeth may be out of alignment with the clutch teeth of the clutch ring. In this instance, forces applied to the clutch ring by the drive shaft have a tendency to press against the ends of the splines of the clutch ring, while the shift fork is in abutting engagement with a knuckle of the integrated wheel end. Since the base portion of the shift fork is abutting against the knuckle, axial forces applied to the axially unrestricted clutch ring impart stresses across the radial dimension of the shift fork which can potentially cause breakage or cracking of the shift fork during installation.

Accordingly, it would be advantageous to provide a means for restricting axial movement of the clutch ring during assembly of the integrated wheel end to the drive shaft, whereby axial forces applied to the clutch ring by the drive shaft during tightening of a retention nut or other attachment means do not impart significant stresses or moments across the radial dimension of the shift fork which may result in damage there to. It would be further advantageous to provide such a means which does not require redesign or redevelopment of existing integrated wheel ends, which does not risk the introduction of particulate matter into the external splines of the coupler, and which does not result in a weakening of the various splined components.

BRIEF SUMMARY OF THE INVENTION

Briefly stated, the present disclosure provides an integrated wheel end which includes a movable clutch ring having internal splines for selective engagement with the external splines of a drive shaft and a wheel end coupler, between an engaged and disengaged position for transferring driving torque from the drive shaft to the wheel end. The integrated wheel end incorporates a clutch ring abutment feature which is independent of the coupler, and which is configured to limit axial travel of the movable clutch ring relative to the coupler on the wheel end during assembly with the drive shaft.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale. Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 7:
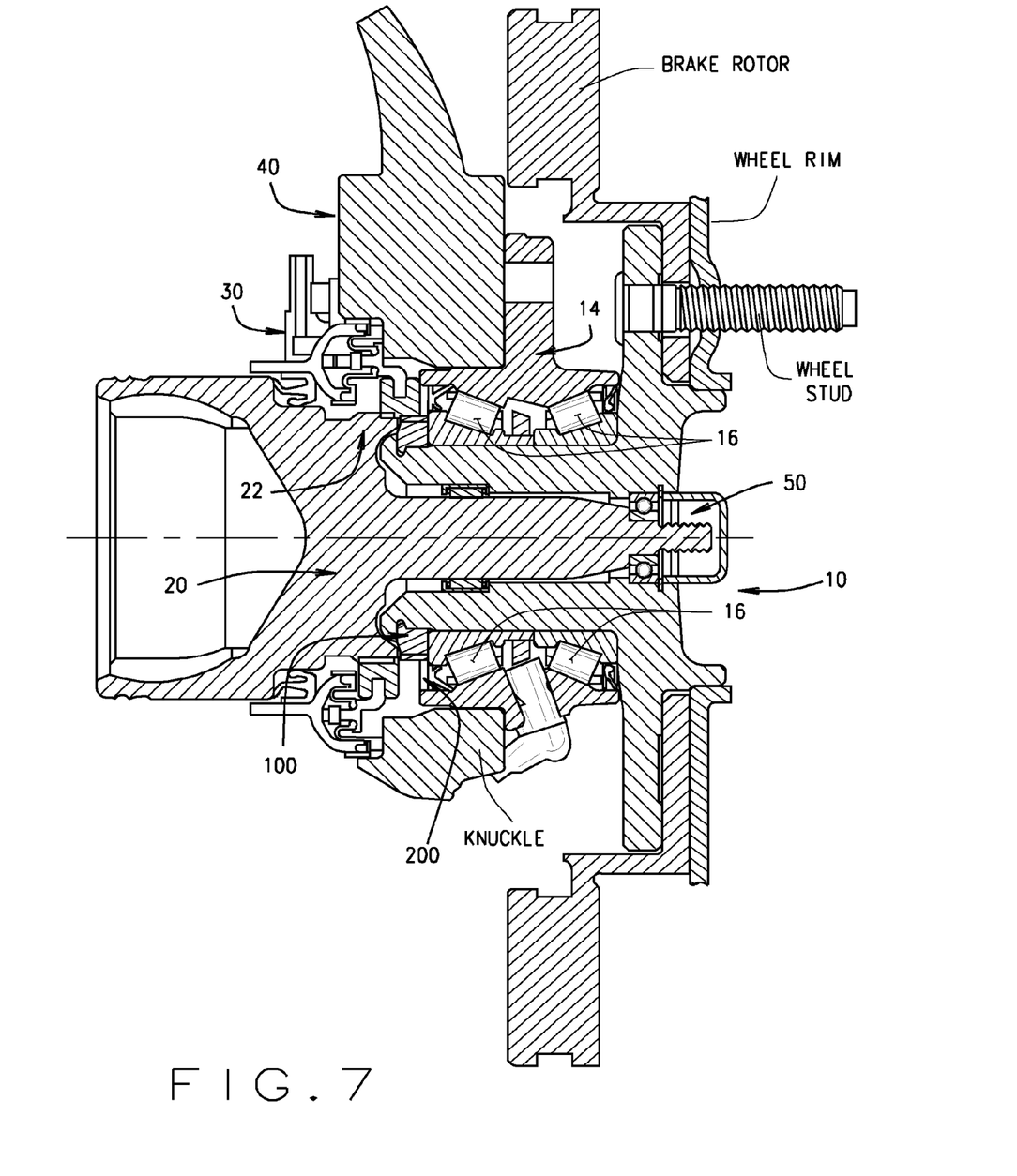
FIG. 7 is a sectional view of an integrated wheel end assembly mounted to a drive shaft and supporting knuckle.

In general, a drive component of an integrated wheel end 10, referred to as a coupler 100, has external splines 102 which are in close axial relationship to a driven drive shaft 20 having matching external splines. A clutch ring 200 having internal splines 202 which match the external splines 102 of the coupler and the drive shaft 20 is disposed in engagement with the external splines 22 of the drive shaft 20 and may be axially displaced for sliding engagement with the external splines 102 of the coupler 100 to selectively couple and decouple the drive shaft 20 from the integrated wheel end 10. A traditional actuating mechanism, including a shift fork 30, as seen in FIG. 7, is engaged with an annular groove 204 in the outer peripheral edge of the clutch ring 200 to provide for mechanical movement of the clutch ring into and out of splined engagement with the coupler 100. Axial movement of the shift fork 30 during engagement is limited by an abutting relationship with a knuckle surface 40 of the integrated wheel end 10.

Figure 1A:
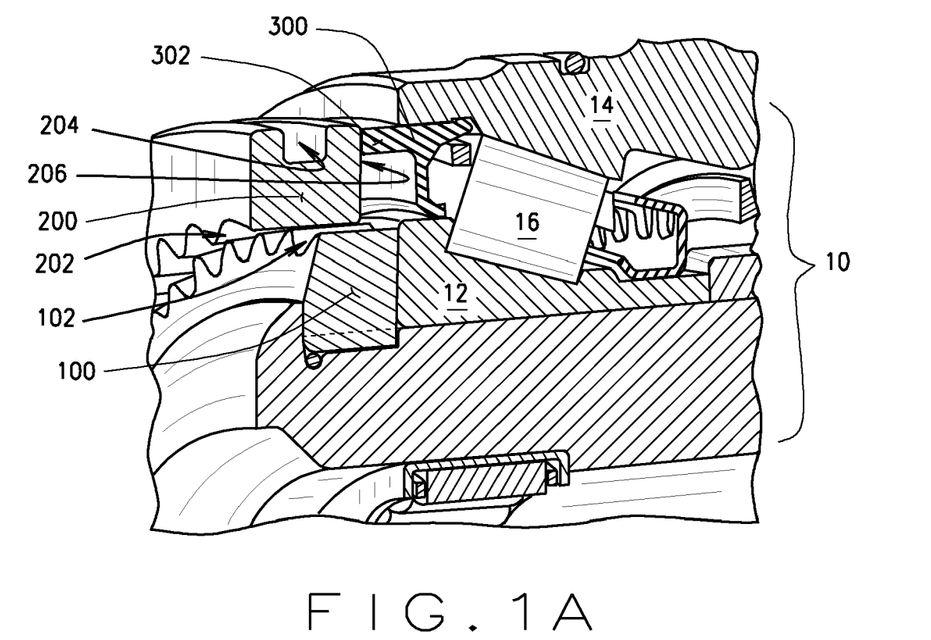
FIG. 1A is cut-away perspective view of an integrated wheel end of the present disclosure including a modified grease retainer ring configured to limit axial movement of the movable clutch ring shown in the engaged position.
Figure 1B:
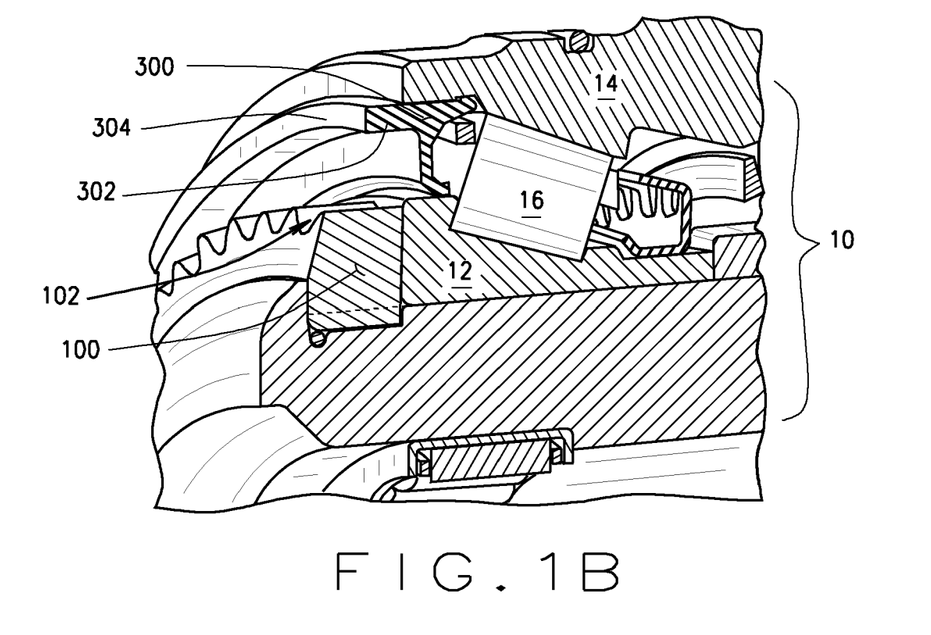
FIG. 1B is a view identical to FIG. 1A, with the movable clutch ring removed.

Turning to FIGS. 1A and 1B, in a first embodiment, a modified grease retainer ring 300 is configured to provide a means for restricting axial movement or travel of the clutch ring 200 during assembly of the integrated wheel end 10 to the drive shaft 20, whereby axial forces applied to the clutch ring 200 by the drive shaft 20 during tightening of a retention nut 50 or other attachment means do not impart significant stresses or moments across the radial dimension of the shift fork 30 which may result in damage there to. Specifically, the grease retainer ring 300, which is disposed between the inner race 12 and outer races 14 of the bearing 16 to retain grease within the bearing and to prevent the entry of contaminates, is modified to include a rigid axially extending annular flange 302. The axially extending annular flange 302 extends axially from the grease retainer ring 300, and provides an annular surface 304 against which an annular face 206 of the clutch ring 200 will abut against when engaged with the external splines 102 of the coupler 100. Abutting engagement between the clutch ring 200 and the axially extending annular flange 302 of the grease retainer ring 300 prevents the clutch ring 200 from moving axially towards the bearings 16 in response to applied axial loads, thereby significantly reducing stresses induced in the shift fork 30 during assembly. It will be readily recognized by those of ordinary skill in the art that the embodiment shown in FIGS. 1A and 1B does not require redesign or redevelopment of existing integrated wheel ends 10, and does not risk the introduction of particulate matter into the exposed splines 102, 202 nor result in a weakening of the splined components.

Figure 2A:
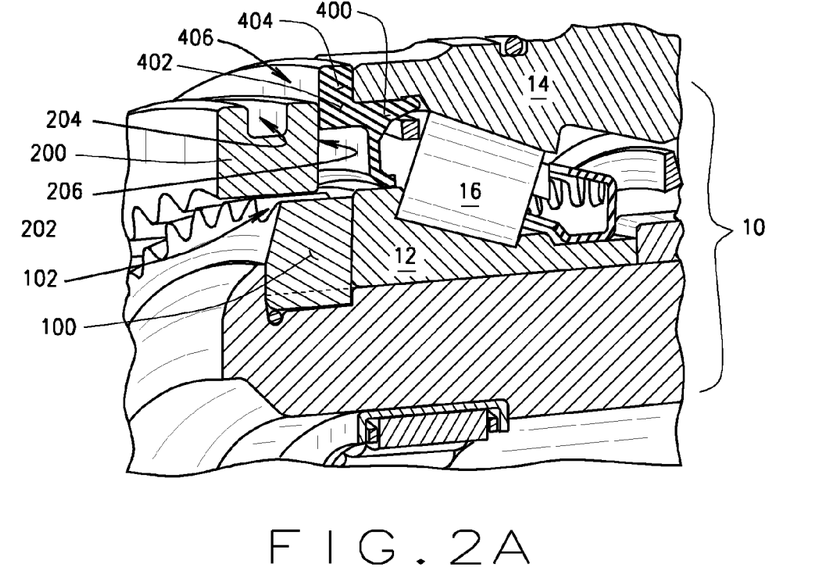
FIG. 2A is cut-away perspective view of an integrated wheel end of the present disclosure including an alternate modified grease retainer ring configured to limit axial movement of the movable clutch ring shown in the engaged position.
Figure 2B:
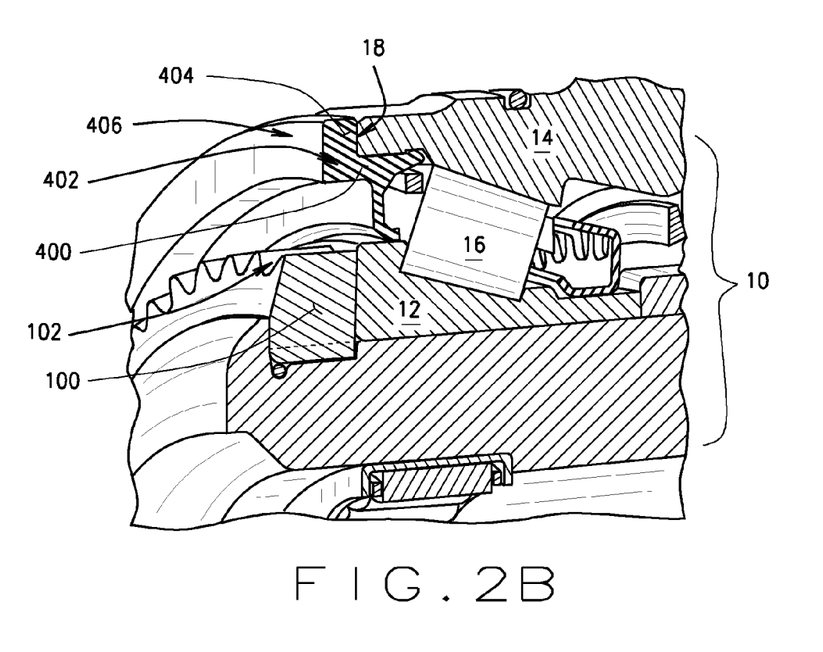
FIG. 2B is a view identical to FIG. 2A, with the movable clutch ring removed.

Turning to FIGS. 2A and 2B, an alternate embodiment of the modified grease retainer ring 400 is configured to provide a means for restricting axial movement of the clutch ring 200 during assembly of the integrated wheel end to the drive shaft 20. Specifically, the modified grease retainer ring 400, which is disposed between the inner race 12 and outer race 14 of the bearing 16 to retain grease within the bearing and to prevent the entry of contaminates, is modified to include a rigid axially extending annular flange 402 and overlap portion 404. The axially extending annular flange 402 extends axially from the grease retainer ring 400, and the overlap portion 404 extends radially outward along an annular end surface 18 of the bearing outer race 14, to provides an annular surface 406 against which the annular face 206 of the clutch ring 200 will abut against when engaged with the external splines 102 of the coupler 100. Abutting engagement between the clutch ring 200 and the axially extending annular flange 402 and overlap surface 406 of the modified grease retainer ring 400 prevents the clutch ring 200 from moving axially towards the bearings 16 in response to applied axial loads, thereby significantly reducing stresses induced in the shift fork during assembly. It will be readily recognized by those of ordinary skill in the art that the embodiment shown in FIGS. 2A and 2B does not require redesign or redevelopment of existing integrated wheel ends 10, and does not risk the introduction of particulate matter into the exposed splines 102, 202 nor result in a weakening of the splined components.

Figure 3A:
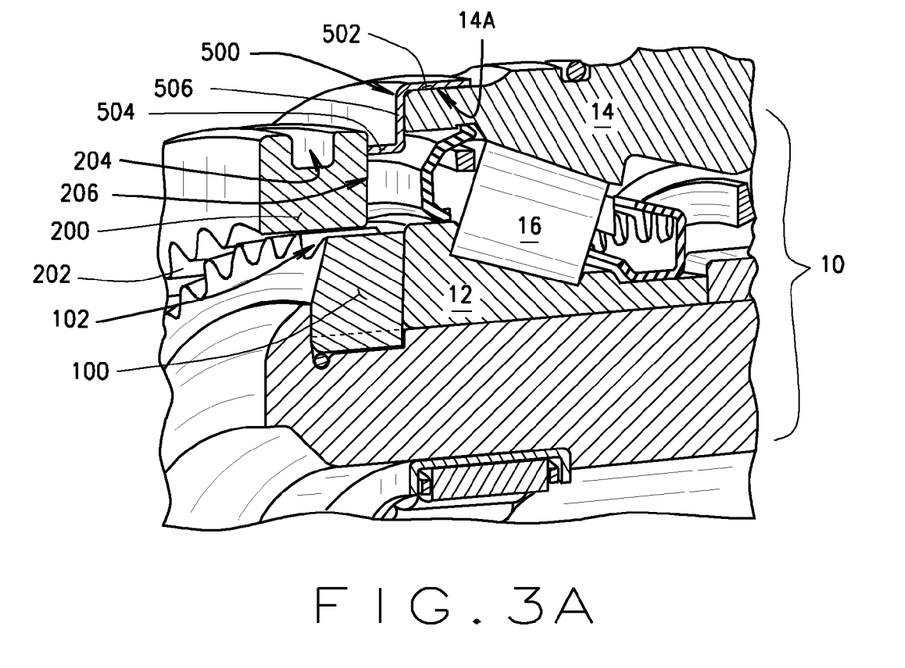
FIG. 3A is cut-away perspective view of an integrated wheel end of the present disclosure including a clutch ring abutment ring flange mounted onto a relieved outer diameter of the bearing outer race to limit axial movement of the movable clutch ring shown in the engaged position.
Figure 3B:
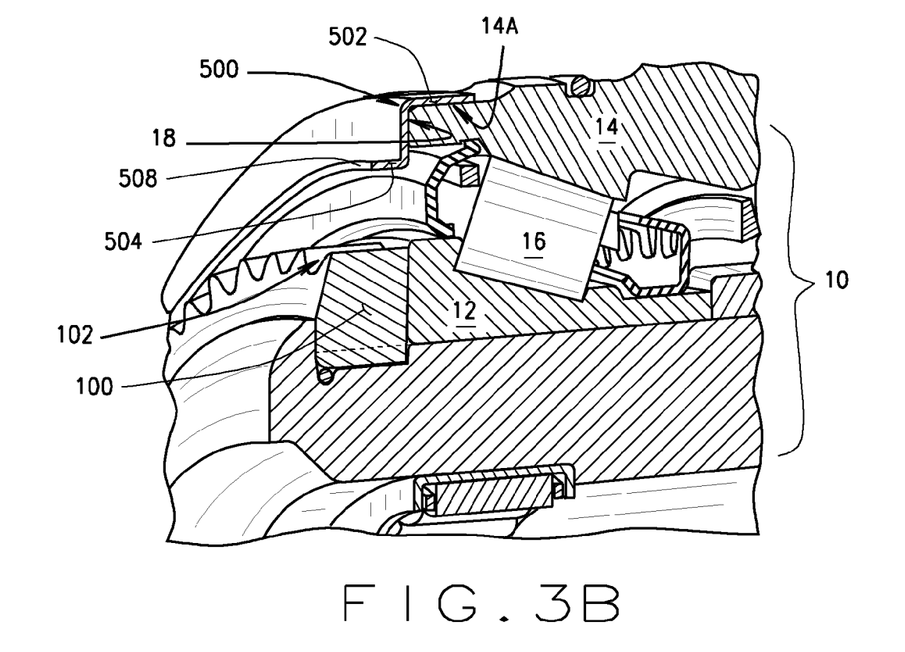
FIG. 3B is a view identical to FIG. 3A, with the movable clutch ring removed.

Turning to FIGS. 3A and 3B, a clutch ring abutment ring flange 500 mounted onto a relieved outer diameter 14A of the bearing outer race 14 is configured to provide a means for restricting axial movement of the clutch ring 200. Specifically, the clutch ring abutment ring flange 500 consists of an axially extending outer diameter portion 502 which fits over a relieved outer diameter 14A of the bearing outer race 14, and an axially extending inner diameter portion 504 which extends axially from the bearing outer race end surface 18, and which is contiguous with the outer diameter portion via an annular web 506. The axially extending inner diameter portion 504 provides an annular surface 508 against which an annular face 206 of the clutch ring 200 will abut when engaged with the external splines 102 of the coupler 100. Abutting engagement between the clutch ring 200 and the axially extending inner diameter portion 504 of the clutch ring abutment ring flange 500 prevents the clutch ring 200 from moving axially towards the bearings 16 in response to applied axial loads, thereby significantly reducing stresses induced in the shift fork 30 during assembly. It will be readily recognized by those of ordinary skill in the art that the embodiment shown in FIGS. 3A and 3B does not require redesign or redevelopment of existing integrated wheel ends 10, and does not risk the introduction of particulate matter into the exposed splines 102, 202 nor result in a weakening of the splined components.

Figure 4A:
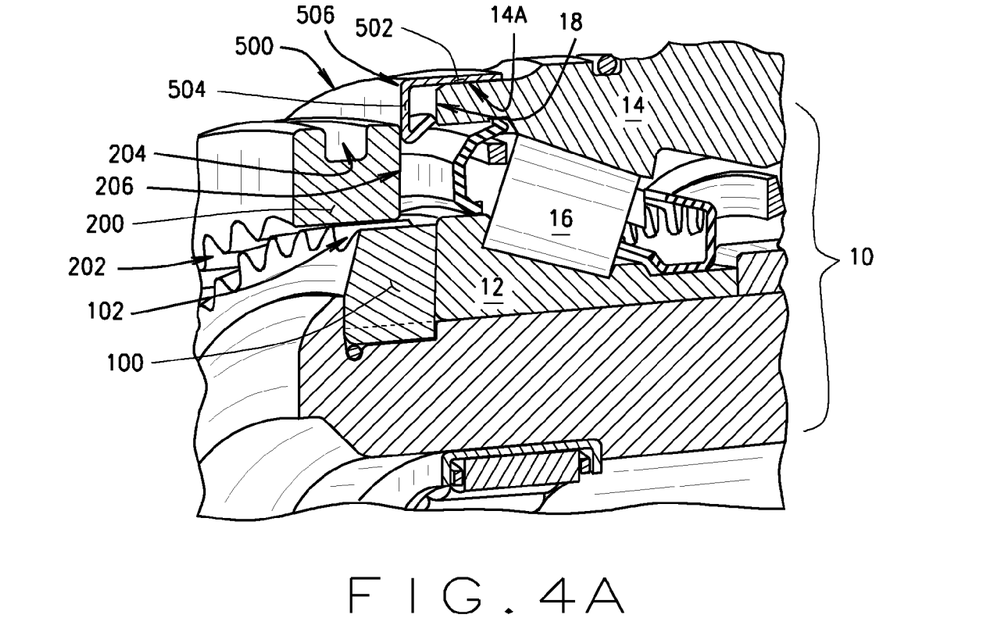
FIG. 4A is cut-away perspective view of an integrated wheel end of the present disclosure including a clutch ring abutment formed ring mounted onto a relieved outer diameter of the bearing outer race to limit axial movement of the movable clutch ring shown in the engaged position.
Figure 4B:
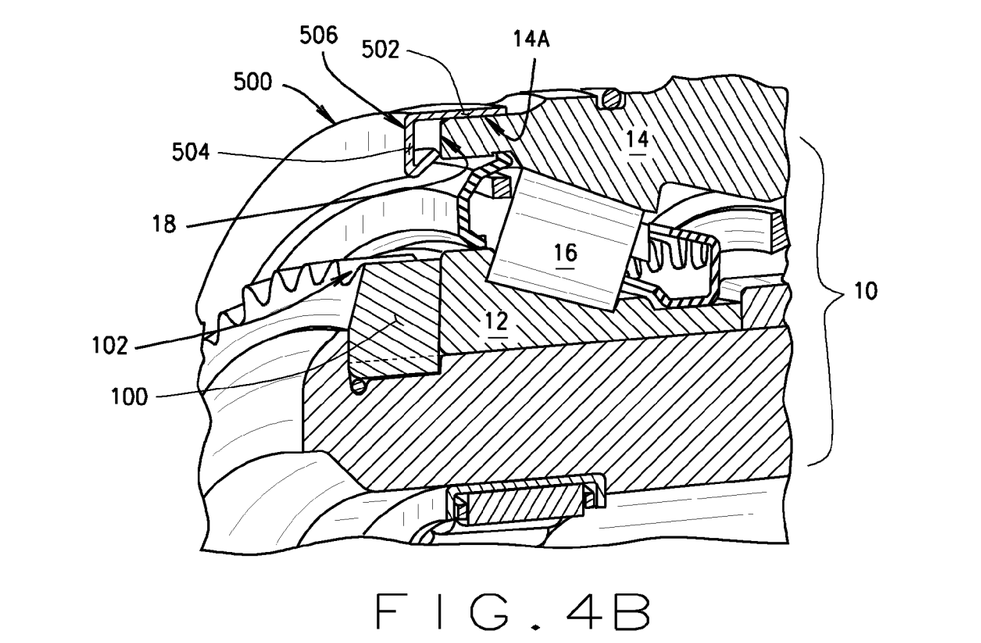
FIG. 4B is a view identical to FIG. 4A, with the movable clutch ring removed.

Turning to FIGS. 4A and 4B, a clutch ring abutment formed ring 500 mounted onto the relieved outer diameter 14A of the bearing outer race 14 is configured to provide a means for restricting axial movement of the clutch ring 200. Specifically, the clutch ring abutment formed ring 500 defines a contiguous J-shaped annular member. The elongated portion 502 of the "J" shaped defines an axially extending outer diameter portion which fits over a relieved outer diameter 14A of the bearing outer race 14, while the curved hook portion 504 of the "J" shape is turned radially inward and back to an abutting relationship with the bearing outer race end surface 18. The curved hook portion 504 of the "J" shape portion provides an annular surface 506 against which an annular face 206 of the clutch ring 200 will abut when engaged with the external splines 102 of the coupler 100. Abutting engagement between the clutch ring 200 and the formed ring 500 prevents the clutch ring 200 from moving axially towards the bearings 16 in response to applied axial loads, thereby significantly reducing stresses induced in the shift fork during assembly. It will be readily recognized by those of ordinary skill in the art that the embodiment shown in FIGS. 4A and 4B does not require redesign or redevelopment of existing integrated wheel ends 10, and does not risk the introduction of particulate matter into the exposed splines 102, 202 nor result in a weakening of the splined components.

Figure 5A:
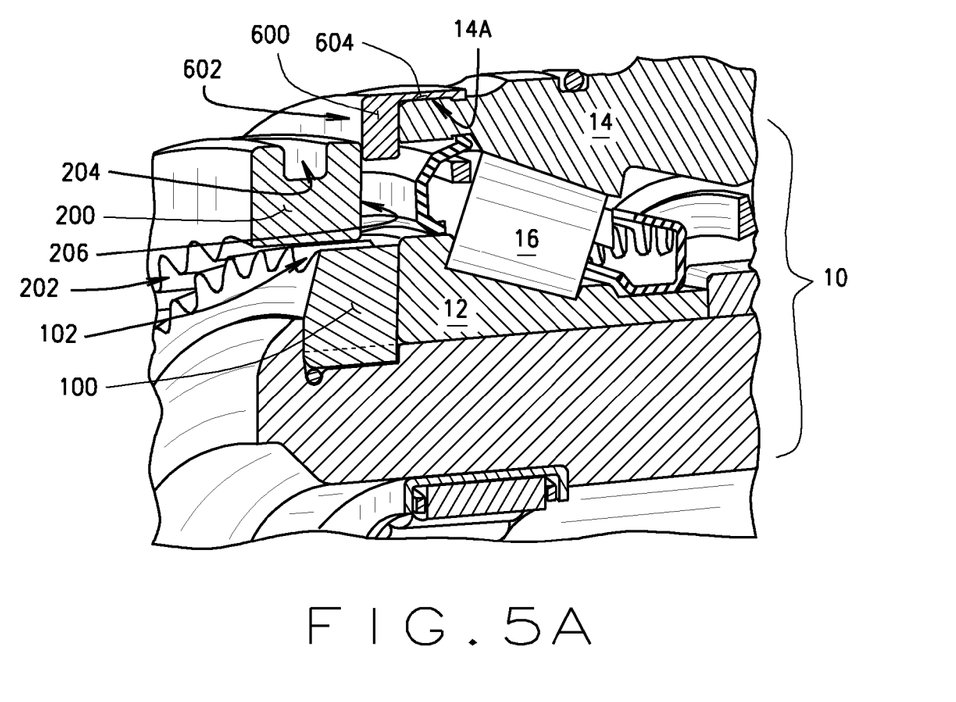
FIG. 5A is cut-away perspective view of an integrated wheel end of the present disclosure including a clutch ring abutment annular spacer mounted onto a relieved outer diameter of the bearing outer race to limit axial movement of the movable clutch ring shown in the engaged position.
Figure 5B:
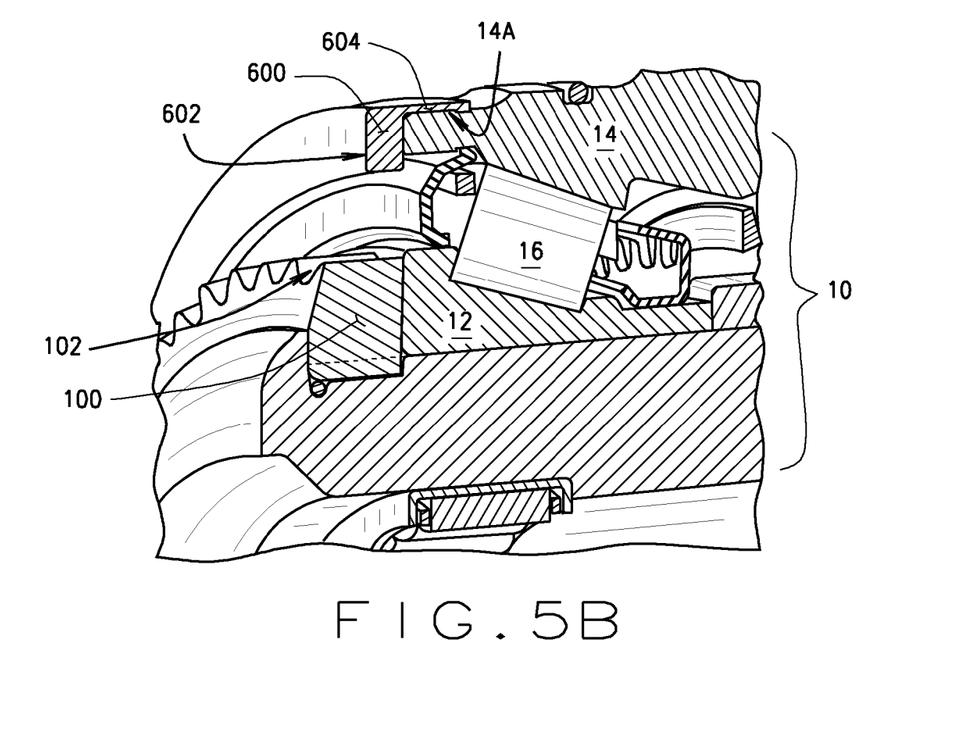
FIG. 5B is a view identical to FIG. 5A, with the movable clutch ring removed.

Turning to FIGS. 5A and 5B, a clutch ring abutment annular spacer 600 mounted onto a relieved outer diameter 14A of the bearing outer race 14 is configured to provide a means for restricting axial movement of the clutch ring 200. Specifically, the clutch ring abutment annular spacer 600 consists of ring 602 of resilient material disposed axially adjacent the bearing outer race end surface 18, and which includes an axially extended portion 604 fitted over a relieved outer diameter 14A of the bearing outer race 14. The ring portion 602 has sufficient axial thickness to provide an annular surface against which an annular face 206 of the clutch ring 200 will abut when engaged with the external splines 102 of the coupler 100. Abutting engagement between the clutch ring 200 and the annular spacer 600 prevents the clutch ring 200 from moving axially towards the bearings 16 in response to applied axial loads, thereby significantly reducing stresses induced in the shift fork 30 during assembly. It will be readily recognized by those of ordinary skill in the art that the embodiment shown in FIGS. 5A and 5B does not require redesign or redevelopment of existing integrated wheel ends 10, and does not risk the introduction of particulate matter into the exposed splines 102, 202 nor result in a weakening of the splined components.

Figure 6A:
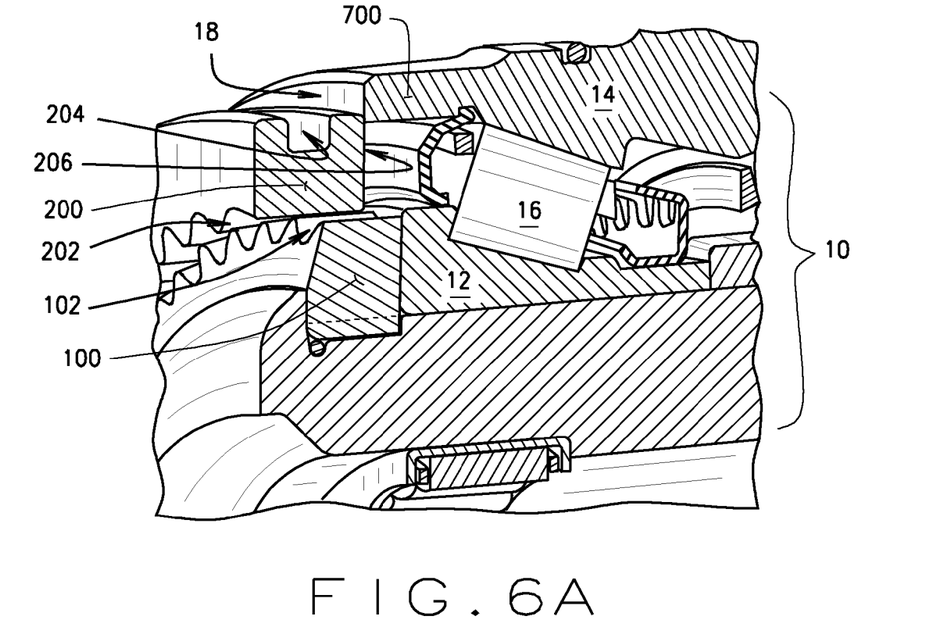
FIG. 6A is cut-away perspective view of an integrated wheel end of the present disclosure including an annular extension of the inboard face of the bearing outer race to limit axial movement of the movable clutch ring shown in the engaged position.
Figure 6B:
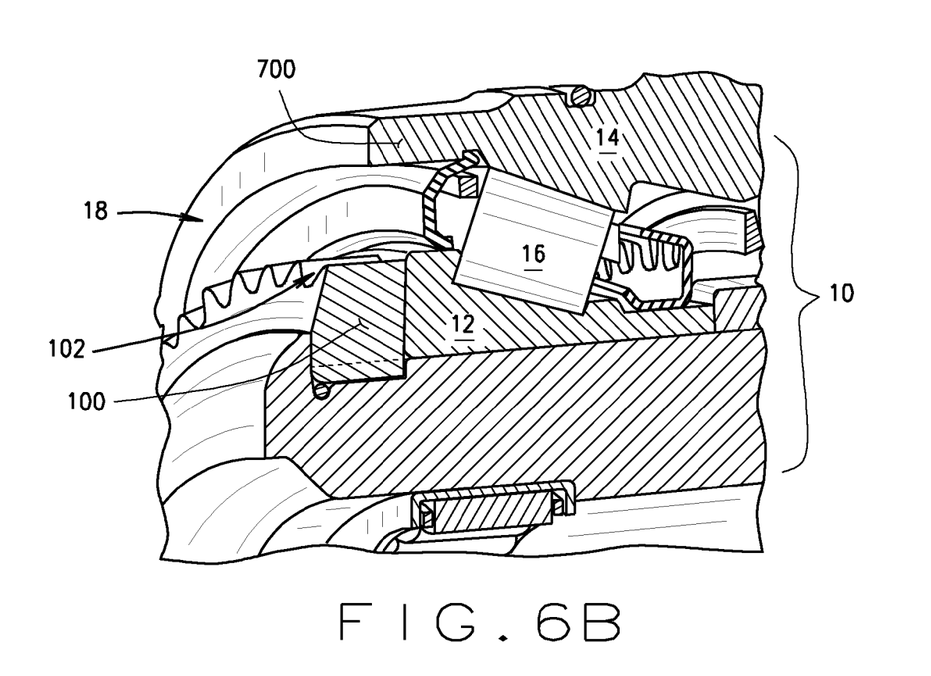
FIG. 6B is a view identical to FIG. 6A, with the movable clutch ring removed.

Turning to FIGS. 6A and 6B, an annular extension 700 of the inboard face 18 of the bearing outer race 14 is configured to provide a means for restricting axial movement of the clutch ring 200. Specifically, the annular extension 700 extends the outer face 18 of the bearing outer race 14 in an axial direction sufficiently far so as to provide an annular surface against which an annular face 206 of the clutch ring 200 will abut when engaged with the external splines 102 of the coupler 100. Abutting engagement between the clutch ring 200 and the annular extension 700 prevents the clutch ring 200 from moving axially towards the bearings 16 in response to applied axial loads, thereby significantly reducing stresses induced in the shift fork 30 during assembly. It will be readily recognized by those of ordinary skill in the art that the embodiment shown in FIGS. 6A and 6B does not require redesign or redevelopment of existing integrated wheel ends 10, and does not risk the introduction of particulate matter into the exposed splines 102, 202 nor result in a weakening of the splined components.

Those of ordinary skill in the art will recognize that while the present disclosure is described in the context of facilitating the coupling of a drive shaft 20 to an integrated vehicle wheel end 10 for a part-time driven vehicle wheel, the inventive concepts and embodiments described herein are not limited to such, and may be utilized in a variety of devices in which a pair of axially aligned splined components are engaged and disengaged by means of a sliding clutch ring such as 200.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An integrated wheel end including a movable clutch ring having internal splines for selective engagement between an engaged and disengaged position to transfer driving torque from an externally splined drive shaft to an externally splined wheel end coupler supported within an integrated wheel end by a bearing assembly including an inner race, an outer race, and a plurality of rolling elements, comprising:
   a clutch ring abutment means disposed independently of the wheel end coupler and integral with an inboard bearing grease retainer ring fitted between the inner and outer races of the bearing assembly, said abutment means configured to limit axial travel of the movable clutch ring relative to the wheel end coupler by abutting contact with an annular axial end surface of the clutch ring in response to stresses on a component in abutting contact with a structure of said wheel end for positioning said clutch ring; and
   wherein said clutch ring abutment means is an axial extension of said inboard bearing grease retainer ring.

2. The integrated wheel end of claim 1 wherein said axial extension radially overlaps an annular end surface of the bearing outer race.

3. An integrated wheel end including a movable clutch ring having internal splines for selective engagement between an engaged and disengaged position to transfer driving torque from an externally splined drive shaft to an externally splined wheel end coupler supported within an integrated wheel end by a bearing assembly including an inner race, an outer race, and a plurality of rolling elements, comprising:
   a clutch ring abutment means disposed independently of the wheel end coupler, said abutment means configured to limit axial travel of the movable clutch ring relative to the wheel end coupler by abutting contact with an annular axial end surface of the clutch ring in response to stresses on a component in abutting contact with a structure of said wheel end for positioning said clutch ring; and
   wherein said clutch ring abutment means is an annular ring flange, said annular ring flange having an outer diameter portion fitted to an outer surface of the bearing outer race and further having an axially extending inner diameter portion contiguous with the outer diameter portion via a radially inward annular web, said inner diameter axial portion extending axially from the bearing outer race end surface and defining an abutting surface for the clutch ring.

4. An integrated wheel end including a movable clutch ring having internal splines for selective engagement between an engaged and disengaged position to transfer driving torque from an externally splined drive shaft to an externally splined wheel end coupler supported within an integrated wheel end by a bearing assembly including an inner race, an outer race, and a plurality of rolling elements, comprising:

a clutch ring abutment means disposed independently of the wheel end coupler, said abutment means configured to limit axial travel of the movable clutch ring relative to the wheel end coupler by abutting contact with an annular axial end surface of the clutch ring in response to stresses on a component in abutting contact with a structure of said wheel end for positioning said clutch ring; and wherein said clutch ring abutment means is in the form of a contiguous J-shaped annular member, an elongated portion of said J-shaped annular member defining an axially extending outer diameter portion fitted over an outer diameter of the bearing outer race, and wherein a curved hook portion of the J-shaped annular member is turned radially inward and back to an abutting relationship with the bearing outer race end surface, whereby the curved portion of the J-shaped annular member defines an abutting surface for an annular surface of the clutch ring.

5. A wheel end, comprising:
an axle shaft having clutch teeth thereon;
a spindle portion with a coupling feature on an inboard portion thereof, said spindle portion being rotatably supported adjacent to said axle shaft;
said coupling feature including clutch teeth;
a clutch ring having clutch teeth slidably engaged with the clutch teeth of one of said axle shaft and said coupling feature and engageable with the clutch teeth of the other of said axle shaft and said coupling feature;
a shift fork engaged with said clutch ring, said shift fork configured to abut a structure of said wheel end when said clutch teeth of said clutch ring are slidably engaged with the clutch teeth of said coupling feature; and
a travel limiter disassociated from the coupling feature to limit axial movement of said clutch ring toward an outboard end of said coupling feature when said shift fork abuts said structure.

* * * * *